US012715573B2

(12) United States Patent
Schlipf et al.

(10) Patent No.: US 12,715,573 B2
(45) Date of Patent: Aug. 25, 2026

(54) WING FOR AN AIRCRAFT

(71) Applicant: Airbus Operations GmbH, Hamburg (DE)

(72) Inventors: Bernhard Schlipf, Bremen (DE); Dennis Krey, Bremen (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 19/225,829

(22) Filed: Jun. 2, 2025

(65) Prior Publication Data

US 2025/0368316 A1 Dec. 4, 2025

(30) Foreign Application Priority Data

Jun. 3, 2024 (EP) .................................... 24179487

(51) Int. Cl.
*B64C 9/24* (2006.01)
*B64C 9/02* (2006.01)
*B64C 13/30* (2006.01)

(52) U.S. Cl.
CPC .................. *B64C 9/24* (2013.01); *B64C 9/02* (2013.01); *B64C 13/30* (2013.01)

(58) Field of Classification Search
CPC .. B64C 9/24; B64C 9/02; B64C 13/30; B64C 9/22; B64C 3/50; B64C 3/48
See application file for complete search history.

(56) References Cited

U.S. PATENT DOCUMENTS

| | | | | |
|---|---|---|---|---|
| 4,171,787 | A | 10/1979 | Zapel | |
| 4,427,168 | A | 1/1984 | Mckinney et al. | |
| 6,796,534 | B2 | 9/2004 | Beyer et al. | |
| 8,444,094 | B2 | 5/2013 | Voss et al. | |
| 11,897,613 | B2 | 2/2024 | Schlipf et al. | |
| 12,539,959 | B2 * | 2/2026 | Schlipf | B64C 9/22 |
| 2021/0206473 | A1 | 7/2021 | Godfroid | |
| 2022/0306277 | A1 | 9/2022 | Gartelmann | |
| 2022/0388629 | A1 * | 12/2022 | Schlipf | B64C 13/28 |
| 2025/0206437 | A1 * | 6/2025 | Schlipf | B64C 9/22 |

OTHER PUBLICATIONS

Extended European Search Report for EP 24179487.4, dated Sep. 23, 2024, 6 pages.

* cited by examiner

*Primary Examiner* — Rodney A Bonnette
(74) *Attorney, Agent, or Firm* — Nixon & Vanderhye, PC

(57) ABSTRACT

A wing for an aircraft is disclosed including a main wing and a leading edge high lift assembly having a high lift body and a connection assembly connecting the high lift body to the main wing in such a way that the high lift body is movable between a stowed position and a deployed positions The connection assembly includes a linkage having a first link element that is mounted to the high lift body and that is mounted to the main wing rotatably about a first axis of rotation, and the main wing includes an upper skin panel and a lower skin panel, the upper skin panel has a leading edge portion, the high lift body includes a rigid portion and a flexible skin portion. The rigid portion is mounted to the first link element.

16 Claims, 4 Drawing Sheets

29
31
39
33
83
77
35
11
91
65
55
67
59
51
85
22
18,19
21
75
47,49
53
23
17
24
18,20
5
25
32
34
30
15
41
13

113
101
11
103
107
105
115
117
109
15
97
17,95
51
19
47
21
13
17,93
18
20
5

WING FOR AN AIRCRAFT

CROSS REFERENCE TO RELATED APPLICATION

This application claims priority to and incorporates by reference the entirety of the European Application Number EP 24179487.4, filed Jun. 3, 2024.

BACKGROUND

The present disclosure relates to a wing for an aircraft. Further aspects of the disclosure relate to a leading edge high lift assembly for such a wing as well as a an aircraft comprising such a leading edge high lift assembly and/or such a wing.

The wing comprises a main wing and a leading edge high lift assembly movable relative to the main wing to increase lift of the wing. The leading edge high lift assembly comprises a high lift body and a connection assembly. The high lift body is preferably a droop high lift body referred to as droop nose, droop leading edge, droop flap or slat, in particular sealed slat. The connection assembly is configured for connecting the high lift body to the main wing, in particular to the leading edge of the main wing, in such a way that the high lift body is movable relative to the main wing between a stowed position and a deployed position. The stowed position relates to a position where the wing profile has a lower curvature and might also be referred to as straight position, normal position, cruise position or retracted position, while the deployed position relates to a position where the wing profile has a higher curvature and might also be referred to as drooped position, landing position, on-ground position or extended position.

The connection assembly comprises a linkage including at least a first link element that is mounted to the high lift body and that is mounted to the main wing rotatably about a first axis of rotation. The first link element is mounted to the high lift body directly or indirectly, e.g. to a rib of the high lift body. The first axis of rotation preferably extends in parallel to the span direction and/or in parallel to the extension of the leading edge along the wing, so that the high lift body is rotated about the first axis of rotation when moved between the stowed position and the deployed position.

The main wing comprises an upper skin panel for contact with an ambient flow on an upper side of the main wing, and a lower skin panel for contact with the ambient flow on a lower side of the main wing. The upper skin panel has a leading edge portion in the area of a leading edge of the main wing and facing the high lift body. The upper skin panel and the lower skin panel might be joined at the leading edge of the main wing, or might have an open end at the leading edge of the main wing, where they might be connected or supported against each other via a front spar.

The high lift body comprises a rigid portion and a flexible skin portion configured for contact with the ambient flow. The rigid portion is mounted to the first link element. The flexible skin portion is connected, preferably fixedly and directly connected, in particular directly attached or integrally formed, to the leading edge portion of the upper skin panel and is connected, preferably fixedly and directly connected, in particular directly attached or integrally formed, to the rigid portion of the high lift body, preferably in the area of a leading edge of the high lift body. The flexible skin portion is configured to be deformed, preferably elastically deformed, between a stowed deformation state and a deployed deformation state, when the high lift body is moved between the stowed position and the deployed position, so that the flexible skin portion is in the stowed deformation state when the high lift body is in the stowed position and the flexible skin portion is in the deployed deformation state when the high lift body is in the deployed position.

Further, the connection assembly comprises a drive unit mounted to the main wing and coupled to the first link element for driving the first link element for rotation about the first axis of rotation.

Similar wings are known in the art. By increasing the curvature of the wing profile when the high lift body is moved to the deployed position, lift of the related aircraft can be increased, in particular to allow approach and landing with lower speed and on shorter runways. High lift assemblies with a drooping, downward rotating high lift body that is sealed to the leading edge portion of the upper skin panel, such as droop nose assemblies, relate to simple and effective high lift devices. Some known droop nose assemblies have a step or discontinuity at the upper skin at the transition between the high lift body and the main wing when the high lift body is moved to the deployed position, which might lead to a peak in the aerodynamic pressure profile in this area. Other known droop nose assemblies have a complicated design to avoid discontinuities at the upper skin surface. Yet other droop nose assemblies have a complicated or inefficient actuation system.

SUMMARY

The present disclosure encompasses providing a wing having a very simple and efficient leading edge high lift assembly with an advantageous aerodynamic pressure profile and a simple and efficient actuation system.

This object is achieved in that the rigid portion is mounted to the first link element rotatably about a second axis of rotation. The second axis of rotation preferably extends in a span direction and/or in parallel to the first axis of rotation. Further, the drive unit comprises a rotary actuator mounted to the main wing, preferably fixedly and/or directly mounted to the main wing, and having at least one preferably elongate drive arm, preferably in the form of a crank arm, rotatably driven about a drive axis that is preferably fixed at the main wing, and drivingly engaging the first link element. One of the drive arm and the first link element comprises at least one groove, such as a slot, preferably extending radially or curved away from the drive axis, and the other one of the drive arm and the first link element comprises at least one spigot, such as a pin, drivingly engaging the groove and preferably extending in parallel to the drive axis. The groove might also differ from a straight radial extension and might e.g. be kinked or curved in order to optimize the force engagement direction over the predetermined path of the slat track. Preferably, the drive arm comprises the groove and the first link element comprises the spigot.

In such a way, by rotation of the first link element about the first axis of rotation, the high lift body can rotate relative to the first link element about the second axis of rotation and can be pivoted downwards to increase the curvature of the wing in a very simple and reliable manner, while at the same time the flexible skin portion of the high lift body is continuously bent without forming any discontinuities or steps, thereby leading to an aerodynamically advantageous wing profile. Further, the rotary actuator relates to a very simple, robust, and cost-efficient drive unit, since no high precision gear teeth are involved and assembly tolerances are rather low compared to e.g. a rack-and-pinion drive.

Also, maintenance efforts can be essentially reduced. Further, different positions of the drive arm are possible and a dual load path design with two drive arms is enabled.

According to a preferred embodiment, the linkage further includes a second link element mounted to the main wing rotatably about a third axis of rotation preferably spaced from the first axis of rotation, and mounted to the rigid portion rotatably about a fourth axis of rotation preferably spaced from the second axis of rotation, so that the second link element is preferably spaced from the first link element. Preferably, a four-bar-linkage is formed by the first link element and the second link element together with the distance between the first and third axes of rotation at the main wing and the distance between the second and fourth axes of rotation at the rigid portion. Preferably, the first, second, third and fourth axes of rotation extend in parallel.

According to a further preferred embodiment, the first link element is mounted to a rib of the main wing, preferably to a front end of a rib of the main wing, rotatably about the first axis of rotation, and the second link element is mounted to the rib of the main wing, preferably to the front end of the rib of the main wing, rotatably about the third axis of rotation, preferably so that the high lift body, when moved from the stowed position to the deployed position, is moved at least partly under the rib by the rotating first and second link elements. Preferably, the first and third axes of rotation intersect the rib, i.e. extend within the cross-section of the main wing. The rib is a strong structural part and extends forward in the chord direction, which makes it advantageous to support the first and second link elements.

According to a further preferred embodiment, the first link element is arranged such that the first axis of rotation extends above the second axis of rotation, i.e. on a higher level as the second axis of rotation, with respect to a normal position of the aircraft on the ground, at least when the high lift body is in the stowed position. Preferably, the second link element is arranged such that the third axis of rotation extends above the fourth axis of rotation, i.e. on a higher level as the fourth axis of rotation, with respect to a normal position of the aircraft on the ground. This applies at least when the high lift body is in the stowed position, but preferably also when the high lift body is in the deployed position, i.e. for the entire movement paths of the first and second link element. Preferably, the first link element and/or the second link element are arranged such that when the high lift body is moved from the stowed position to the deployed position, the first and/or second link elements rotate from a forward and/or downward extending orientation to a downward and/or rearward extending orientation. In such a way, a very simple and efficient kinematic is obtained.

According to a further preferred embodiment, the spigot or the groove is provided at a lateral side of the first link element or at an additional holder structure, such as an arm, comprised by the first link element and fixedly mounted to or formed integral with the rest of the first link element and extending away from the rest of the first link element. In such a way, a very simple and efficient load transfer can be achieved.

According to a further preferred embodiment, the spigot engages the groove with a predefined play, preferably in a radial direction with respect to the drive axis or in a direction slightly curved away from the radial direction. This play enabled the drive axis and the first axes of rotation not being coaxial and allows to optimize the drive unit.

According to a further preferred embodiment, the groove is formed as a slot, in particular a long hole, preferably extending in a radial or essentially radial direction or in a partly radial direction with respect to the drive axis, so that the spigot can move radially within the slot when the drive arm is rotated to move the slat track. The slot therefore provides a radial play for the spigot that is beneficial when the drive axis and the first axes of rotation are not coaxial.

According to a further preferred embodiment, the groove is open at an outer end, i.e. at a distal end, of the drive arm. In such a way, the spigot can be easier inserted into the groove, which largely simplifies assembly of the high lift assembly.

According to a further preferred embodiment, the groove defines an inner end position and an outer end position between which the spigot can move in a guided manner when the drive arm is rotated about the drive axis. The inner end position and/or the outer end position might be defined by a hard stop, such as a closed end or a stopper, limiting travel of the spigot mechanically. Alternatively, the inner end position and the outer end position might not be defined by any hard stop but might simply relate to the ends of the travel path of the spigot within the groove. In particular, the inner end position might be defined by a hard stop in the form of end closed end of the groove, while the outer end position might be defined by an end of the travel path of the spigot within the groove, e.g. at the level of the opening of the groove, i.e. the end of the lateral guide, without the groove having any hard stop. Also, it might be possible that even when there is a hard stop, such as a closed end of the groove, the inner and/or outer end is not defined by the hard stop as the travel path of the spigot within the groove ends before the hard stop. The groove defines a center line extending from the inner end position to the outer end position. The groove has a curved form, wherein a distance between the center line and the drive axis increases, preferably continuously increases, from the inner end position towards the outer end position. In such a way, a very smooth and efficient load transmission from the drive arm to the slat track is achieved.

Preferably, the groove has such a form that a distance between the center line and a first reference line increases from the inner end position towards the outer end position, the first reference line having a straight radial extension from the drive axis and intersecting the inner end position of the groove. Preferably, the groove has a convexly curved form or a concavely curved form with respect to the high lift body. Preferably, the groove has one or more locking positions where the curvature essentially differs from the other areas of the groove, wherein a locking position preferably is formed at the inner end position and/or at the outer end position. Such locking positions may serve to lock the spigot vis-à-vis the groove, e.g. in the deployed or stowed position of the high lift body, preferably with no or minimum load being required to hold the position.

According to a further preferred embodiment, the spigot comprises a spigot roller for rolling engagement with the slot. The spigot roller might be arranged at the end of the spigot and might have a rotation axis aligned with the extension of the spigot. By the spigot roller friction can be minimized and the spigot can run smoothly in the groove.

According to a further preferred embodiment, the connection assembly is a first connection assembly and the leading edge high lift assembly comprises a second connection assembly connecting the high lift body to the main wing in a position spaced apart from the first connection assembly. The second connection assembly is preferably formed as the first connection assembly, i.e. comprising a linkage and a drive unit. The first connection assembly and the second connection assembly are coupled by a sync arrangement for synchronized movement between the stowed position and the deployed position. In some embodiments, the leading edge high lift assembly might comprise a third connection assembly connecting the high lift body to the main wing and coupled to the first and second connection assembly by the sync arrangement for synchronized movement between the stowed position and the deployed position. The third connection assembly might be formed as the first connection assembly including a linkage and a drive unit. Four or further connection assembly would be possible, as well. By such sync arrangement, two or more connection assemblies can be actuated together and moved synchronously to assure straight movement of the high lift body and avoid skew.

In particular, it is preferred that the second connection assembly comprises a second linkage including a third link element that is mounted to the high lift body and that is mounted to the main wing rotatably about a fifth axis of rotation. Further, the second connection assembly comprises a second drive unit mounted to the main wing and coupled to the third link element for driving the third link element for rotation about the fifth axis of rotation. Preferably, the second drive unit is formed as the first drive unit, i.e. the drive unit of the first connection assembly, including a groove and a corresponding spigot. The sync arrangement comprises a drive shaft coupling the first drive arm, i.e. the drive arm of the first connection assembly, and the second drive arm for synchronized movement of the first drive arm and the second drive arm between the stowed position and the deployed position of the high lift body. The drive shaft might be coupled to the first drive arm and to the second drive arm by fixed a connection or by a geared connection. In such a way, a very simple and efficient sync arrangement is obtained. Further, by using different forms or curvatures of the groove of the first drive unit vis-à-vis the groove of the second drive unit, different movement paths can be achieved at the first and second connection assembly, as desired.

It is further preferred that the wing further comprises a motor for rotatably driving the drive shaft. The motor is preferably formed as a linear motor driving the drive shaft via a lever mounted to the drive shaft. Preferably, the lever is rotatably mounted to the linear motor and is attached to the drive shaft in a torque proof manner extending transverse to the extension of the drive shaft. The lever might also be coupled to the drive shaft by a gear. Alternatively, the motor might be formed as a rotating motor drivingly engaging the drive shaft, e.g. via a gear. In such a way, a simple and efficient sync arrangement is obtained.

A further aspect of the disclosure relates to a leading edge high lift assembly for the wing according to any of the afore-described embodiments. The leading edge high lift assembly comprises a high lift body and a connection assembly for connecting the high lift body to a main wing in such a way that the high lift body is movable relative to the main wing between a stowed position and a deployed position. The connection assembly comprises a linkage including a first link element that is mounted to the high lift body and that is configured to be mounted to the main wing rotatably about a first axis of rotation. The high lift body comprises a rigid portion and a flexible skin portion. The rigid portion is mounted to the first link element. The flexible skin portion is configured to be connected to a leading edge portion of an upper skin panel of the main wing and is connected to the rigid portion of the high lift body. The flexible skin portion is configured to be deformed between a stowed deformation state and a deployed deformation state, when the high lift body is moved between the stowed position and the deployed position. The connection assembly comprises a drive unit configured to be mounted to the main wing and coupled to the first link element for driving the first link element for rotation about the first axis of rotation. The rigid portion is mounted to the first link element rotatably about a second axis of rotation. The drive unit comprises a rotary actuator configured to be mounted to the main wing and having at least one drive arm rotatably driven about a drive axis and drivingly engaging the first link element. One of the drive arm and the first link element comprises at least one groove and the other one of the drive arm and the first link element comprises at least one spigot drivingly engaging the groove. Features and effects described above in connection with the wing apply vis-a-vis also for the leading edge high lift assembly.

A further aspect of the disclosure relates to an aircraft comprising the wing according to any of the afore-described embodiments and/or comprising the leading edge high lift assembly according to any of the afore described embodiments. Features and effects described above in connection with the wing and in connection with the leading edge high lift assembly apply vis-a-vis also in case of the aircraft.

BRIEF DESCRIPTION OF THE DRAWINGS

The disclosure will be better understood when reading the following description, which is given solely by way of example and with reference to the appended drawings, in which.

DETAILED DESCRIPTION OF SOME EMBODIMENTS

Some embodiments will now be described with reference to the Figures.

Figure 1:
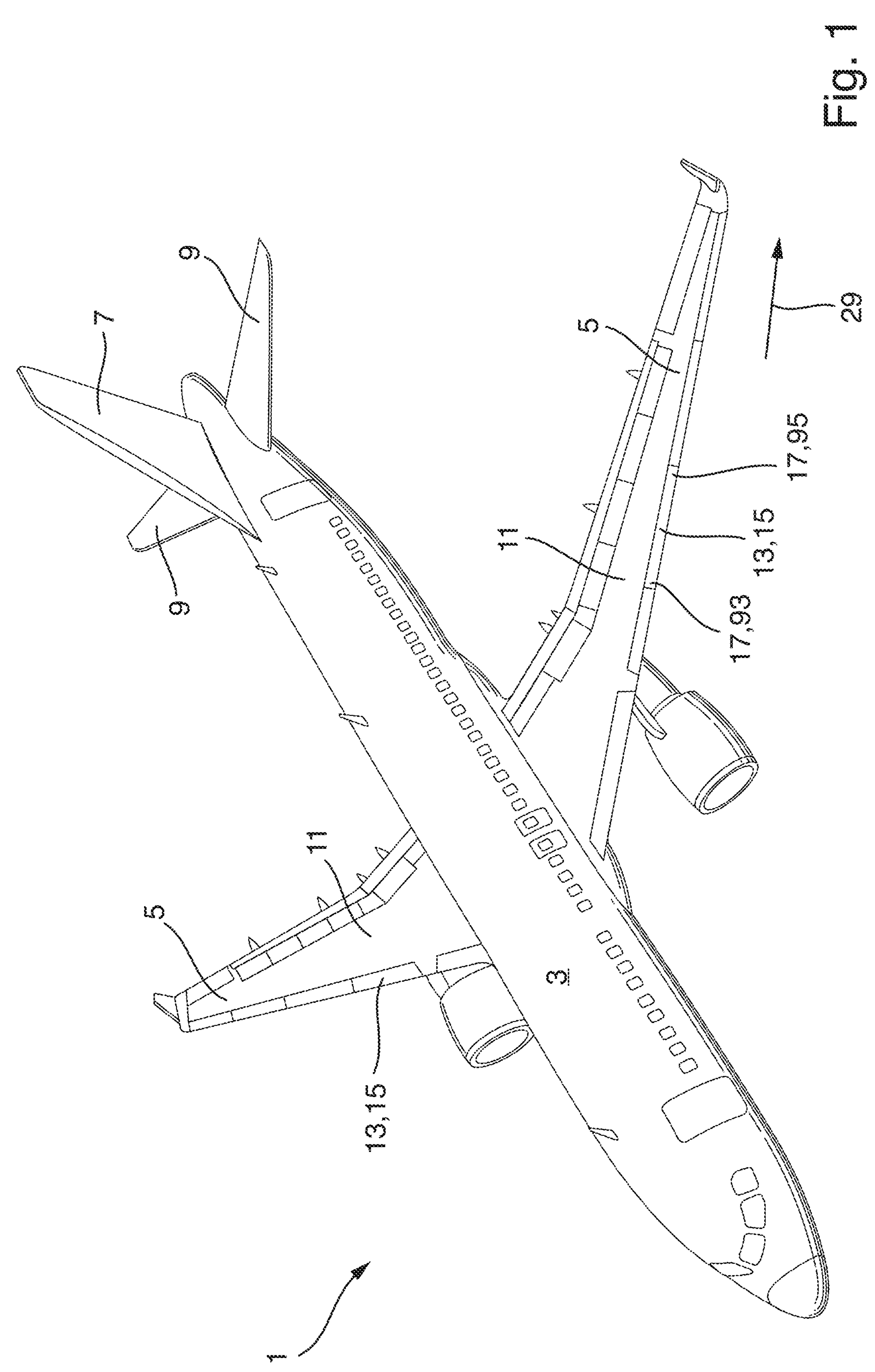
FIG. 1 is a perspective view of an aircraft according to an exemplary embodiment.
Figure 2:
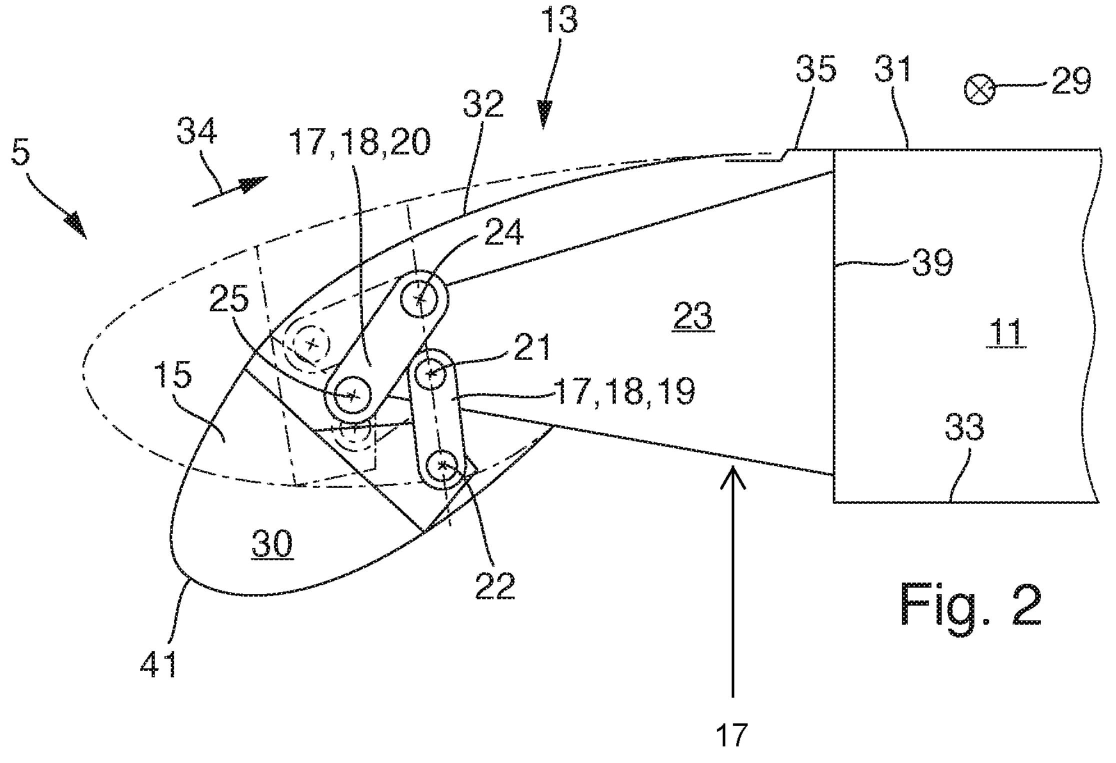
FIG. 2 is a schematic cross-sectional view across the span direction of a wing according to an exemplary embodiment not showing the drive unit, with a high lift body in the stowed position and in the deployed position.
Figure 3:
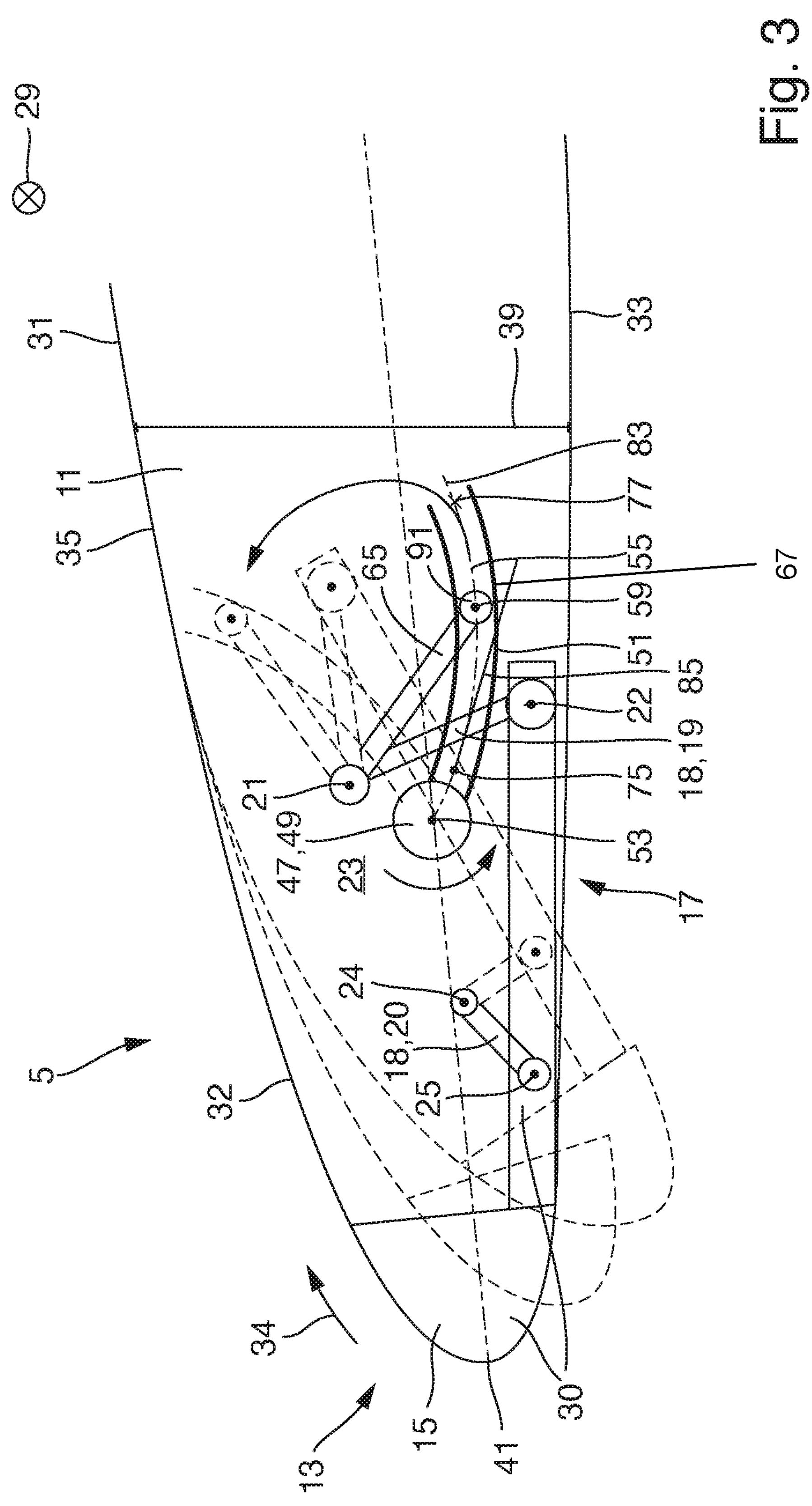
FIG. 3 is a schematic cross-sectional view across the span direction of a wing according to an exemplary embodiment with a high lift body in the stowed position and in the deployed position.
Figure 4:
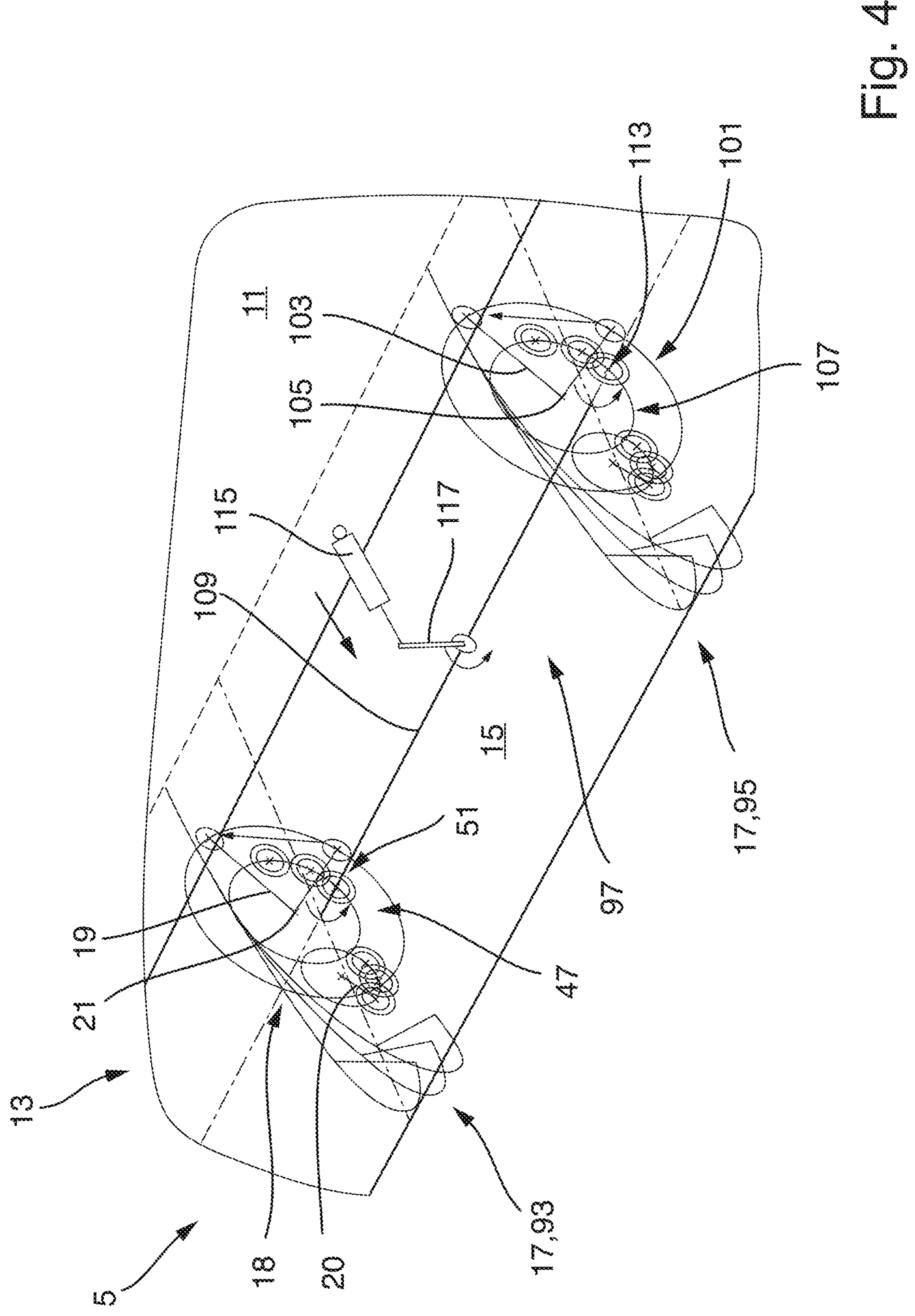
FIG. 4 is a schematic perspective view of a wing an exemplary embodiment including two connection assemblies that are spaced from one another and that are coupled by a sync arrangement for synchronized movement.

In FIG. 1 an embodiment of an aircraft 1 according to an exemplary embodiment is illustrated. The aircraft 1 comprises a fuselage 3, wings 5, a vertical tail plane 7 and a horizontal tail plane 9. FIGS. 2 to 4 show in more detail several embodiments of the wings 5.

FIG. 2 shows a first embodiment of the wing 5 according to an exemplary embodiment. The wing 5 comprises a main wing 11 and a leading edge high lift assembly 13 movable relative to the main wing 11 to increase lift of the wing 5. The leading edge high lift assembly 13 comprises a high lift body 15 and a connection assembly 17. The high lift body 15 is a droop high lift body also referred to as droop nose, droop leading edge, droop flap or slat, in particular sealed slat. The connection assembly 17 is configured for connecting the high lift body 15 to the leading edge of the main wing 11 in such a way that the high lift body 15 is movable relative to the main wing 11 between a stowed position and a deployed position. The stowed position relates to a position where the wing profile has a lower curvature, while the deployed position relates to a position where the wing profile has a higher curvature.

The connection assembly 17 comprises a linkage 18 including a first link element 19 that is mounted to the high lift body 15 and that is mounted to the main wing 11 rotatably about a first axis of rotation 21. The linkage 18 further includes a second link element 20 mounted to the main wing 11 rotatably about a third axis of rotation 24 spaced from the first axis of rotation 21. The first axis of rotation 21 and the third axis of rotation 24 extend in parallel to a span direction 29 and/or in parallel to the extension of the leading edge along the wing 5, so that the high lift body 15 is rotated about the first axis of rotation 21 and about the third axis of rotation 24 when moved between the stowed position and the deployed position. The first axis of rotation 21 of the first link element 19 and the third axis of rotation 24 of the second link element 20 extend inside of an outer mold line of the wing 5, specifically through a rib 23 of the main wing 11.

The main wing 11 comprises an upper skin panel 31 for contact with an ambient flow 34 on an upper side of the main wing 11, and a lower skin panel 33 for contact with the ambient flow 34 on a lower side of the main wing 11. The upper skin panel 31 has a leading edge portion 35 in the area of a leading edge of the main wing 11 and facing the high lift body 15. The upper skin panel 31 and the lower skin panel 33 are connected and supported against each other via a front spar 39.

The high lift body 15 comprises a rigid portion 30 and a flexible skin portion 32 configured for contact with the ambient flow 34. The rigid portion 30 is mounted to the first link element 19 rotatably about a second axis of rotation 22 and is mounted to the second link element 20 rotatably about a fourth axis of rotation 25 spaced from the second axis of rotation 22, so that the second link element 20 is spaced from the first link element. The second link element 20 extends above the first link element 19 with respect to a normal position of the aircraft 1 on the ground. The second axis of rotation 22 and the fourth axis of rotation 25 extend in a span direction 29 and/or in parallel to the first axis of rotation 21. In such a way, a four-bar-linkage is formed by the first link element 19 and the second link element 20 together with the distance between the first and third axes of rotation 21, 24 at the main wing 11 and the distance between the second and fourth axes of rotation 22, 25 at the rigid portion 30. The first, second, third and fourth axes of rotation 21, 22, 24, 25 extend in parallel.

The flexible skin portion 32 is fixedly and directly attached to the leading edge portion 35 of the upper skin panel 31 and is fixedly and directly attached to the rigid portion 30 of the high lift body 15 in the area of a leading edge 41 of the high lift body 15. The flexible skin portion 32 is configured to be elastically deformed between a stowed deformation state and a deployed deformation state, when the high lift body 15 is moved between the stowed position and the deployed position, so that the flexible skin portion 32 is in the stowed deformation state when the high lift body 15 is in the stowed position and the flexible skin portion 32 is in the deployed deformation state when the high lift body 15 is in the deployed position.

The first link element 19 and the second link element 20 are mounted to a front end of a rib 23 of the main wing 11 rotatably about the first and third axes of rotation 21, 24, so that the high lift body 15, when moved from the stowed position to the deployed position, is moved partly under the rib 23 by the first and second link elements 19, 20. The first link element 19 is arranged such that the first axis of rotation 21 extends above the second axis of rotation 22, i.e. on a higher level as the second axis of rotation 22, and the second link element 20 is arranged such that the third axis of rotation 24 extends above the fourth axis of rotation 25, i.e. on a higher level as the fourth axis of rotation 25, with respect to a normal position of the aircraft 1 on the ground. In the present embodiment, this applies when the high lift body 15 is in the deployed position as well as when the high lift body 15 is in the stowed position, i.e. for the entire movement path of the first and second link elements 19, 20. The first and second link elements 19 in the present embodiment are arranged such that when the high lift body 15 is moved from the stowed position to the deployed position, the first and second link elements 19, 20 rotate from a forward extending orientation to a downward extending orientation, i.e. in a downward and/or backward direction, but might in other embodiments also rotate from a downward extending direction to a backward extending direction.

In the embodiment shown in FIG. 2 the connection assembly 17 further comprises a drive unit 47 that it not shown in FIG. 2 but that is formed similar as the drive unit 47 shown in FIG. 3 and described hereinafter.

FIG. 3 shows a further embodiment of the wing similar to the embodiment of FIG. 2 but showing a connection assembly 17 including a drive unit 47 as described hereinafter. The drive unit 47 is mounted to the main wing 11 and coupled to the first link element 19 for driving the first link element 19 for rotation about the first axis of rotation 21. The drive unit 47 comprises a rotary actuator 49 mounted to the main wing 11 and having an elongate drive arm 51 in the form of a crank arm rotatably driven about a drive axis 53 that is fixed at the main wing 11, and drivingly engaging the first link element 19. The drive arm 51 comprises a groove 55, such as a slot, and the first link element 19 comprises a spigot 59, such as a pin, drivingly engaging the groove 55 and extending in parallel to the drive axis 53.

In the present embodiment, the first link element 19 comprises an additional holder structure 65 in the form of an arm fixedly mounted to or integrally formed with the rest of the first link element 19 and extending away from the rest of the first link element 19, and the spigot 59 is provided at a lateral side of the holder structure 65. The spigot 59 engages the groove 55 with a predefined play slightly curved away from a radial direction 67 with respect to the drive axis 53. Further, the groove 55 is open at an outer end, i.e. at a distal end, of the drive arm 51, so that the spigot 59 can be easier inserted into the groove 55, which largely simplifies assembly of the high lift assembly 13.

The groove 55 defines an inner end position 75 and an outer end position 77 between which the spigot 59 can move in a guided manner when the drive arm 51 is rotated about the drive axis 53. The inner end position 75 and/or the outer end position 77 might be defined by a hard stop, such as a closed end or a stopper, limiting travel of the spigot 59 mechanically. Alternatively, the inner end position 75 and the outer end position 77 might not be defined by any hard stop but might simply relate to the ends of the travel path of the spigot 59 within the groove 55. In particular, the inner end position 75 might be defined by a hard stop in the form of end closed end of the groove 55, while the outer end position 77 might be defined by an end of the travel path of the spigot 59 within the groove 55, e.g. at the level of the opening of the groove 55, i.e. the end of the lateral guide, without the groove 55 having any hard stop. Also, it might be possible that even when there is a hard stop, such as a closed end of the groove 55, the inner and/or outer end is not defined by the hard stop as the travel path of the spigot 59 within the groove ends before the hard stop. The groove 55 defines a center line 83 extending from the inner end position 75 to the outer end position 77. The groove 55 has a curved form, wherein a distance between the center line 83 and the drive axis 53 continuously increases from the inner end position 75 towards the outer end position 77.

The groove 55 has such a form that a distance between the center line 83 and a first reference line 85 increases from the inner end position 75 towards the outer end position 77, the first reference line 85 having a straight radial extension from the drive axis 53 and intersecting the inner end position 75 of the groove 55. The groove 55 has a convexly curved form with respect to the high lift body 15. The spigot 59 comprises a spigot roller 91 for rolling engagement with the slot. The spigot roller 91 is arranged at the end of the spigot 59 and has a rotation axis aligned with the extension of the spigot 59.

In the embodiment shown in FIG. 4, the connection assembly 17 is a first connection assembly 93 and the leading edge high lift assembly 13 comprises a second connection assembly 95 connecting the high lift body 15 to the main wing 11 in a position spaced apart from the first connection assembly 93. The second connection assembly 95 is formed as the first connection assembly 93, i.e. comprising a linkage 18 and a drive unit 47 formed as those of the first connection assembly. The first connection assembly 93 and the second connection assembly 95 are coupled by a sync arrangement 97 for synchronized movement between the stowed position and the deployed position. By such sync arrangement 97, two or more connection assemblies 17 can be actuated together and moved synchronously to assure straight movement of the high lift body 15 and avoid skew.

The second connection assembly 95 comprises a second linkage 101 including a third link element 103 that is mounted to the high lift body 15 and that is mounted to the main wing 11 rotatably about a fifth axis of rotation 105. Further, the second connection assembly 95 comprises a second drive unit 107 mounted to the main wing 11 and coupled to the third link element 103 for driving the third link element 103 for rotation about the fifth axis of rotation 105. The second drive unit 107 is formed as the drive unit 47, including a rotating second drive arm 113 as well as a groove 55 and a corresponding spigot 59. The sync arrangement 97 comprises a drive shaft 109 coupling the drive arm 51 of the first connection assembly 93 and the second drive arm 113 for synchronized movement of the drive arm 51 and the second drive arm 113 between the stowed position and the deployed position of the high lift body 15. The drive shaft 109 might be coupled to the drive arm 51 and to the second drive arm 113 by a fixed connection or by a geared connection.

The wing 5 further comprises a motor 115 for rotatably driving the drive shaft 109. The motor 115 in the present embodiment is formed as a linear motor driving the drive shaft 109 via a lever 117 mounted to the drive shaft 109. The lever 117 is rotatably mounted to the linear motor 115 and is attached to the drive shaft 109 in a torque proof manner extending transverse to the extension of the drive shaft 109. The lever 117 might also be coupled to the drive shaft 109 by a gear.

By the disclosure as described above, a wing 5 with a very efficient leading edge high lift assembly 13 can be formed. By rotation of the first and second link elements 19, 20 about the first and third axes of rotation 21, 24, the high lift body 15 can rotate relative to the first and second link elements 19, 20 about the second and fourth axes of rotation 22, 25 and can be pivoted downwards to increase the curvature of the wing 5 in a very simple and reliable manner, while at the same time the flexible skin portion 32 of the high lift body 15 is continuously bent without forming any discontinuities or steps, thereby leading to an aerodynamically advantageous wing profile. Further, the rotary actuator 49 relates to a very simple, robust, and cost-efficient drive unit 47, since no high precision gear teeth are involved and assembly tolerances are rather low compared to e.g. a rack-and-pinion drive. Also, maintenance efforts can be essentially reduced. Further, different positions of the drive arm 51 are possible and a dual load path design with two drive arms 51 is enabled.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:

a main wing and a leading edge high lift assembly comprising a high lift body and a connection assembly connecting the high lift body to the main wing in such a way that the high lift body is movable relative to the main wing between a stowed position and a deployed position, wherein the connection assembly comprises a linkage including a first link element that is mounted to the high lift body and that is mounted to the main wing rotatably about a first axis of rotation, wherein the main wing comprises an upper skin panel and a lower skin panel, wherein the upper skin panel has a leading edge portion, wherein the high lift body comprises a rigid portion and a flexible skin portion, wherein the rigid portion is mounted to the first link element, wherein the flexible skin portion is connected to the leading edge portion of the upper skin panel of the main wing and is connected to the rigid portion of the high lift body, and wherein the flexible skin portion is configured to be deformed between a stowed deformation state and a deployed deformation state, when the high lift body is moved between the stowed position and the deployed position, wherein the connection assembly comprises a drive unit mounted to the main wing and coupled to the first link element for driving the first link element for rotation about the first axis of rotation, wherein the rigid portion is mounted to the first link element rotatably about a second axis of rotation, the drive unit comprises a rotary actuator mounted to the main wing and having at least one drive arm rotatably driven about a drive axis and drivingly engaging the first link element, one of the drive arm and the first link element comprises at least one groove and the other one of the drive arm and the first link element comprises at least one spigot drivingly engaging the groove.

2. The wing according to claim 1, wherein the linkage further includes a second link element mounted to the main wing rotatably about a third axis of rotation and mounted to the rigid portion rotatably about a fourth axis of rotation.

3. The wing according to claim 1, wherein the first link element is mounted to a rib of the main wing rotatably about the first axis of rotation, and/or wherein the second link element is mounted to a rib of the main wing rotatably about the third axis of rotation.

4. The wing according to claim 1, wherein the first link element is arranged such that the first axis of rotation extends above the second axis of rotation, and/or wherein the second link element is arranged such that the third axis of rotation (24) extends above the fourth axis of rotation.

5. The wing according to claim 1, wherein the spigot or the groove is provided at a lateral side of the first link element or at an additional holder structure comprised by the first link element.

6. The wing according to claim 1, wherein the spigot engages the groove with a predefined play.

7. The wing according to claim 1, wherein the groove is formed as a slot extending in a radial direction with respect to the drive axis.

8. The wing according to claim 1, wherein the groove is open at an outer end of the drive arm.

9. The wing according to claim 1, wherein the groove defines an inner end position and an outer end position between which the spigot can move in a guided manner when the drive arm is rotated about the drive axis, wherein the groove defines a center line extending from the inner end position to the outer end position, the groove has a curved form, wherein a distance between the center line and the drive axis increases from the inner end position towards the outer end position.

10. The wing according to claim 1, wherein the spigot comprises a spigot roller for rolling engagement with the slot.

11. The wing according to claim 1, wherein the connection assembly is a first connection assembly and the leading edge high lift assembly comprises a second connection assembly connecting the high lift body to the main wing in a position spaced apart from the first connection assembly, wherein the first connection assembly and the second connection assembly are coupled by a sync arrangement for synchronized movement between the stowed position and the deployed position.

12. The wing according to claim 11, wherein the second connection assembly comprises a second linkage including a third link element that is mounted to the high lift body and that is mounted to the main wing rotatably about a fifth axis of rotation, wherein the second connection assembly comprises a second drive unit mounted to the main wing and coupled to the third link element for driving the third link element for rotation about the fifth axis of rotation, wherein the sync arrangement comprises a drive shaft coupling the drive arm and a second drive arm for synchronized movement of the drive arm and the second drive arm between the stowed position and the deployed position of the high lift body.

13. The wing according to claim 12, further comprising a motor for rotatably driving the drive shaft, wherein the motor is formed as a linear motor driving the drive shaft via a lever.

14. A leading edge high lift assembly for the wing according to claim 1, comprising a high lift body, and a connection assembly for connecting the high lift body to the main wing in such a way that the high lift body is movable relative to the main wing between a stowed position and a deployed position, wherein the connection assembly comprises a linkage including a first link element that is mounted to the high lift body and that is configured to be mounted to the main wing rotatably about a first axis of rotation, wherein the high lift body comprises a rigid portion and a flexible skin portion, wherein the rigid portion is mounted to the first link element, wherein the flexible skin portion is configured to be connected to a leading edge portion of an upper skin panel of the main wing and is connected to the rigid portion of the high lift body, and wherein the flexible skin portion is configured to be deformed between a stowed deformation state and a deployed deformation state, when the high lift body is moved between the stowed position and the deployed position, wherein the connection assembly comprises a drive unit configured to be mounted to the main wing and coupled to the first link element for driving the first link element for rotation about the first axis of rotation, wherein the rigid portion is mounted to the first link element rotatably about a second axis of rotation, the drive unit comprises a rotary actuator configured to be mounted to the main wing and having at least one drive arm rotatably driven about a drive axis and drivingly engaging the first link element, one of the drive arm and the first link element comprises at least one groove and the other one of the drive arm and the first link element comprises at least one spigot drivingly engaging the groove.

15. An aircraft comprising the leading edge high lift assembly according to claim 14.

16. An aircraft comprising the wing according to claim 1.

* * * * *